United States Patent

[11] 3,626,285

| | | | | | |
|---|---|---|---|---|---|
| [72] | Inventor | Jerome L. Hartke<br>Sudbury, Mass. | 3,323,043 | 5/1967 | Hekiman .................... 324/57 |
| [21] | Appl. No. | 847,266 | 3,514,705 | 5/1970 | Feigleson .................... 328/133 |
| [22] | Filed | Aug. 4, 1969 | | | |
| [45] | Patented | Dec. 7, 1971 | | | |
| [73] | Assignee | KEV Electronics Corporation<br>Wilmington, Mass. | | | |

Primary Examiner—Edward E. Kubasiewicz
Attorney—Kenway, Jenney & Hildreth

[54] TESTING APPARATUS FOR VOLTAGE-VARIABLE CAPACITORS EMPLOYING PHASE-LOCKED OSCILLATORS
10 Claims, 1 Drawing Fig.

[52] U.S. Cl. .................................................. 324/60 R,
328/133, 328/155, 331/36, 324/82
[51] Int. Cl. ........................................................ G01r 11/52
[50] Field of Search .......................................... 324/57, 59,
60, 61, 79, 82; 307/195, 233; 328/133, 155;
331/18, 25, 36, 178

[56] References Cited
UNITED STATES PATENTS
3,210,684  10/1965  Morrison et al. .............  331/36 X ABSTRACT: In the apparatus disclosed herein, a test oscillator employing a voltage-variable capacitor as a frequency-determining element and a reference oscillator are phase locked to the same frequency. The phase lock circuit employs a phase detector and a low-pass filter to provide a DC error signal having an amplitude which is a function of the phase difference between the output signals of the two oscillators. This DC voltage is applied to the voltage-variable capacitor thereby controlling the frequency of the test oscillator to obtain phase lock. As the operating frequency of the reference oscillator is varied as a function of time, the amplitude of the DC error signal is used as a measure of the voltage-dependent capacitance characteristic of the capacitor under test.

3,626,285

TESTING APPARATUS FOR VOLTAGE-VARIABLE CAPACITORS EMPLOYING PHASE-LOCKED OSCILLATORS

BACKGROUND OF THE INVENTION

This invention relates to testing apparatus for voltage-variable capacitors and more particularly to apparatus for measuring or checking the voltage-dependent capacitance characteristic of such a capacitor.

As a plurality of voltage-variable capacitors may be employed as frequency-determining elements in a given piece of electronic equipment, e.g. a radiofrequency receiver, it is typically desirable that the capacitors have matching voltage-dependent capacitance characteristics. In other words, the capacitors should track one another. Thus, in the manufacture of such devices, there is a need for test apparatus which will quickly and automatically determine whether the voltage-dependent capacitance characteristic of a given device conforms to a predetermined standard. Heretofore, such testing has typically been done on a point-by-point basis using conventional impedance bridge or frequency-measuring techniques. Such techniques, however, are relatively time consuming and determine the characteristic behavior of the voltage-variable capacitor only at discrete points. Further, while the determination of a sufficient number of such discrete points gives a degree of assurance that the entire characteristic will meet a given standard with a predetermined degree of accuracy, it is still deemed preferable that a continuous determination of the voltage-dependent capacitance characteristic be made for each capacitor tested.

Among the several objects of the present invention may therefore be noted the provision of apparatus which will test the voltage-dependent capacitance characteristic of a voltage-variable capacitor; the provision of such apparatus which will determine the characteristic continuously over a substantial range of values; the provision of such apparatus which is substantially automatic in operation; the provision of such apparatus which provides very accurate measurement; and the provision of such apparatus which is relatively simple and inexpensive.

Other objects and features will be in part apparent and in part pointed out hereinafter.

SUMMARY OF THE INVENTION

Briefly, apparatus according to the present invention is operative to test or measure the voltage-dependent capacitance characteristic of a voltage-variable capacitor. The apparatus includes a reference oscillator means which provides an output signal at a corresponding predetermined frequency for each value of a respective control signal and a test oscillator which employs the voltage-variable capacitor being tested as a frequency-determining element and which thus provides an output signal at a frequency which is a function of a control signal applied to the capacitor. A phase detector provides a DC error signal which varies as a function of the phase difference between the output signals of the two oscillators. The control voltage applied to one of the oscillators is varied as a function of this error signal thereby to phase lock the oscillators to the same output frequency. Further means are provided for varying the control voltage applied to the other of the oscillators as a function of time thereby to correspondingly vary the respective output signal frequency. Accordingly, as the frequency is varied, the amplitude of the error signal varies as a function of the voltage-dependent capacitance characteristic of the voltage-variable capacitor.

BRIEF DESCRIPTION OF THE DRAWING

The single FIGURE is a block diagram of apparatus according to the present invention for testing the voltage-dependent capacitance characteristic of a voltage-variable capacitor.

DESCRIPTION OF THE PREFERRED EMBODIMENT

Figure 1:
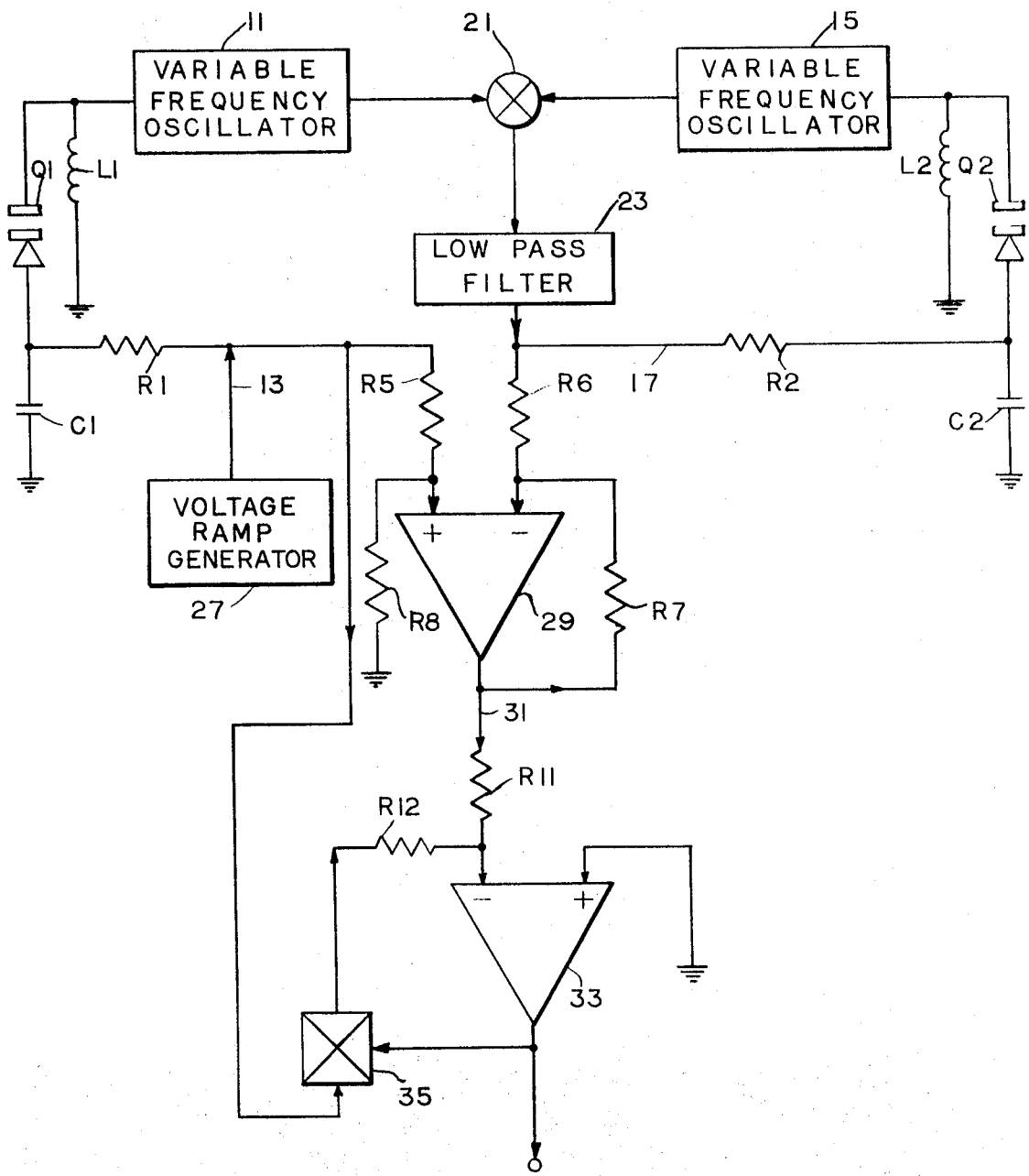

Referring now to the drawing, a voltage-variable capacitor which is to be tested is indicated at Q1. Capacitor Q1 and an inductor L1 form the tank circuit for a variable-frequency oscillator indicated at 11. The voltage-variable capacitor Q1 thus constitutes one of the frequency-determining elements of oscillator 11. A control voltage is applied to the capacitor Q1 through a lead 13 for varying its capacitance value, suitable decoupling being provided by a resistor R1 and a capacitor C1.

As a convenient standard or reference, the apparatus illustrated employs a second voltage-variable capacitor Q2 having a known and acceptable voltage-dependent capacitance characteristic against which the characteristic of capacitor Q1 may be compared. The reference capacitor Q2 is interconnected with an inductor L2 in a second oscillator circuit 15. Except for possible differences in the characteristics of the voltage-variable capacitors, the oscillator circuits 11 and 15 are preferably as nearly identical as possible. A control voltage for varying the effective capacitance of capacitor Q2 is applied thereto through a lead 17, suitable decoupling again being provided by a resistor R2 and a capacitor C2.

The output signals from the two oscillators 11 and 15, suitably buffered to prevent loading effects on the oscillator circuits, are applied to respective input terminals of a phase detector circuit 21. Phase detector circuit 21 operates to provide an error signal having an amplitude (a DC component) which varies as a function of the phase difference between the two oscillator output signals applied thereto. A low-pass filter 23 is employed to eliminate components in the error signal at the operating frequencies of the oscillators.

The lead 17 is connected to the output of the low-pass filter 23 so that the effective capacitance value of the voltage-variable capacitor Q2 varies as a function of the error signal. The operating frequency of the oscillator circuit 15 will thus also vary as a function of the error signal. As is understood by those skilled in the art, the oscillator circuit 15 will thus be phase locked to the operating frequency as the oscillator circuit 11. In other words, the DC or low frequency component of the output signal from the phase detector 21 functions as an error signal in a feedback loop which brings the frequencies of the two oscillators into coincidence and provides phase lock. The control voltage applied to capacitor Q2 (the error signal) is designated V2.

Lead 13 is connected to a voltage ramp generator 27 so that the control voltage applied to the capacitor Q1 under test is varied as a function of time. This voltage is designated V1. As is understood, the operating frequency of the oscillator 11 incorporating the capacitor Q1 will thus be varied correspondingly.

The control signal from the ramp generator 27, which functions as the control voltage for oscillator 11, and the error signal provided by the phase detector 21, which functions as the control voltage for the oscillator 15, are compared by means of a circuit employing a differential amplifier 29. Amplifier 29 is interconnected in a conventional configuration as shown with input and feedback resistors R5–R8 of equal value to provide, at a lead 31, a signal which is equal to the difference between the values of the control voltages, i.e. V1–V2. This voltage is thus equal to the difference voltage required to be applied to capacitor Q1 to cause it to exhibit a value of capacitance equal to that exhibited by the reference or standard capacitor Q2.

As an alternative, the sum of the ramp and error signals can be applied to the one oscillator which is phase locked to the other oscillator. The error signal itself will then be equal to the difference or voltage deviation without subsequent signal subtraction.

In order to obtain a signal which is proportional to the percentage deviation of the test control voltage from the reference control voltage, lead 31 is connected, through a mixing resistance R11, to the inverting input of a differential amplifier 33. The other input of this amplifier is grounded as indicated and its output is applied to one of the input terminals of a four-quadrant analog multiplier 35. The test control voltage V1 is applied to the other input terminal of the multiplier 35. The output signal from multiplier 35, which is proportional to the product of the two input signals, is applied, through a mixing resistor R12, to the inverting input terminal of the differential amplifier 33. As is understood by those skilled in the art, this interconnection of multiplier 35 and amplifier 33 in the feedback configuration illustrated causes the output signal from amplifier 33 to be proportional to the percentage deviation of the voltage V1 from the reference voltage V2. In other words, the output signal is proportional to (V1−V2)/V)

The percentage deviation signal (V1−V2)/V1 may then be applied to appropriate threshold logic circuitry for generating an appropriate indication or control operation if the percentage deviation exceeds a predetermined level. Such a signal may be utilized for rejecting or recategorizing the voltage-variable capacitor under test as will be understood by those skilled in the art.

In summary, the operation of the apparatus illustrated is as follows. The operating frequency of the test oscillator 11 is varied as a function of time by a control voltage V1 applied to the capacitor Q1 under test. The frequency of the reference oscillator 15 is controlled by a feedback loop which varies the control voltage V2 applied to the reference capacitor Q2 so as to phase lock the oscillators. The oscillators being otherwise identical, the capacitance values of the two voltage-variable capacitors are thus maintained at the same value and thus the percentage difference between the two control voltages V1−V2)/V is an indication or measure of the percentage deviation of the voltage-variable capacitance characteristic of the device under test (Q1) from the characteristic of the reference device (Q2). Further, this measure of deviation is provided continuously over a substantial range of values as the ramp generator sweeps the common operating frequency of the phase-locked oscillators.

While, in the apparatus illustrated, the test oscillator is swept in frequency and the reference oscillator is phase locked to the test oscillator, it will be apparent to those skilled in the art that the reference oscillator could be swept while the test oscillator is controlled by the feedback loop to maintain phase lock. In either case, the voltages applied to the device under test and the reference device are those which are necessary to cause them to exhibit the same value of capacitance. Further, while a standard or acceptable voltage-variable capacitor provides a convenient reference source, it should be understood that a suitable reference oscillator may be synthesized using digital or analog techniques known to those skilled in the art. Likewise, the apparent voltage-variable capacitance characteristic of a particular device can be modified if desired by the use of nonlinear networks in the control voltage circuits.

Since the apparatus does not require empirical balancing at a succession of discrete values, as is typically the case with conventional bridge-type testing apparatus, it may be seen that this invention is readily adapted for incorporation into automatic production testing apparatus.

By employing miniaturized or integrated circuit components, the two oscillators and the phase lock feedback loop components can easily be grouped at the test point itself. It then is unnecessary to transmit signals at the operating frequencies of the oscillators over any substantial length of cable. Rather, only the relative low-frequency control voltages need be brought out from the test point to remote test control apparatus. Thus, matching of the oscillators 11 and 15 is facilitated.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. Apparatus for testing the voltage-dependent capacitance characteristic of a voltage-variable capacitor, said apparatus comprising:
    reference oscillator means providing an output signal at a corresponding predetermined output frequency for each value of a respective control signal;
    a test oscillator which employs said voltage-variable capacitor as a frequency-determining element and which provides an output signal at a frequency which is a function of a control signal applied to said capacitor;
    a phase detector responsive to said oscillator output signals for providing an error signal which varies as a function of the phase difference between said oscillator output signals;
    means for providing to one of said oscillators a control signal which varies as a function of said error signal thereby to phase lock said oscillators to the same output frequency; and
    means for providing to the other of said oscillators a control signal which varies as a predetermined function of time thereby to correspondingly scan the common output signal frequency over a range of values whereby the amplitude of said error signal varies as a function of the voltage-dependent capacitance characteristic of said capacitor.

2. Apparatus as set forth in claim 1 wherein said reference oscillator is similar to said test oscillator and employs a standard voltage-variable capacitor as a frequency-determining element.

3. Apparatus as set forth in claim 2 wherein the amplitude of the reference oscillator control signal is variable and is applied to said standard voltage-variable capacitor for controlling the operating frequency of the reference oscillator.

4. Apparatus as set forth in claim 3 including means for generating a signal having an amplitude which is proportional to the difference between the amplitudes of said control signals.

5. Apparatus as set forth in claim 3 including means for generating a signal having an amplitude which is proportional to the ratio of the difference between the amplitudes of said control signals to the amplitude of one of said control signals.

6. Apparatus as set forth in claim 3 wherein said means for providing a time-varying control signal to the other oscillator includes a voltage ramp generator.

7. Apparatus for testing the voltage-dependent capacitance characteristic of a voltage-variable capacitor, said apparatus comprising:
    a reference oscillator which employs a standard voltage-variable capacitor as a frequency-determining element and provides an output signal at a corresponding predetermined output frequency for each value of a control voltage applied to said standard capacitor;
    a test oscillator which employs the voltage-variable capacitor being tested as a frequency-determining element and which provides an output signal at a frequency which is a function of a control voltage applied to said capacitor;
    a phase detector responsive to said oscillator output signals for providing an error signal having an amplitude which varies as a function of the phase difference between said oscillator output signals;
    means for providing to one of said oscillators a control voltage which varies as a function of said error signal thereby to phase lock said oscillators to the same output frequency; and
    means for providing to the other of said oscillators a control voltage which varies as a predetermined function of time thereby to correspondingly scan the common output signal frequency over a range of values, whereby the amplitude of said error signal varies as a function of the voltage-dependent capacitance characteristic of said capacitor.

8. Apparatus as set forth in claim 7 including means for generating a signal which is proportional to the difference between the amplitudes of the two control voltages.

9. Apparatus as set forth in claim 7 including means for generating a signal which is proportional to the percentage difference in the amplitude between the two control voltages.

10. Apparatus for testing the voltage-dependent capacitance characteristic of a voltage-variable capacitor, said apparatus comprising:

a reference oscillator which employs a standard voltage-variable capacitor as a frequency-determining element and provides an output signal at a corresponding predetermined output frequency for each value of a control voltage applied to said standard capacitor;

a test oscillator which employs the voltage-variable capacitor being tested as a frequency-determining element and which provides an output signal at a frequency which is a function of a control voltage applied to said capacitor;

a phase detector responsive to said oscillator output signals for providing an error signal having an amplitude which varies as a function of the phase difference between said oscillator output signals;

means for applying said error signal to said standard capacitor thereby to phase lock said reference oscillator to the operating frequency of said test oscillator; and means for applying a ramp voltage to the capacitor being tested thereby to correspondingly vary the common oscillator output signal frequency as a function of time whereby the amplitude of said error signal varies as a function of the voltage-dependent capacitance characteristic of the capacitor being tested.

* * * * *